United States Patent [19]
Shuchart et al.

[11] Patent Number: 5,950,731
[45] Date of Patent: Sep. 14, 1999

[54] METHODS AND COMPOSITIONS FOR BREAKING VISCOSIFIED FLUIDS

[75] Inventors: Chris E. Shuchart, Norman; Billy F. Slabaugh, Marlow; John M. Terracina; Michael A. McCabe, both of Duncan, all of Okla.

[73] Assignee: Halliburton Energy Services, Inc., Duncan, Okla.

[21] Appl. No.: 08/964,534

[22] Filed: Nov. 5, 1997

[51] Int. Cl.$^6$ .............................. E21B 43/25; E21B 43/26
[52] U.S. Cl. .................. 166/300; 166/308; 507/209; 507/215; 507/921; 507/922
[58] Field of Search .................... 507/209, 215, 507/921, 922; 166/300, 308

[56] References Cited

U.S. PATENT DOCUMENTS

| | | | |
|---|---|---|---|
| 4,216,829 | 8/1980 | Murphey | 166/276 |
| 4,506,734 | 3/1985 | Nolte | 166/308 |
| 5,067,565 | 11/1991 | Holtmyer et al. | 166/305.1 |
| 5,103,905 | 4/1992 | Brannon et al. | 166/300 X |
| 5,143,157 | 9/1992 | Harms | 166/300 |
| 5,368,874 | 2/1995 | Laramay et al. | 166/300 |
| 5,413,178 | 5/1995 | Walker et al. | 166/300 |
| 5,441,109 | 8/1995 | Gupta et al. | 166/300 |
| 5,669,446 | 9/1997 | Walker et al. | 166/300 |
| 5,669,447 | 9/1997 | Walker et al. | 166/300 |
| 5,759,964 | 6/1998 | Shuchart et al. | 507/209 |
| 5,806,597 | 9/1998 | Tjon-Joe-Pin | 166/300 |

*Primary Examiner*—George Suchfield
*Attorney, Agent, or Firm*—Robert A. Kent; Clark Dougherty, Jr.

[57] ABSTRACT

The present invention relates to methods of treating subterranean formations and viscosified aqueous well treating compositions which break into thin fluids at temperatures in the range of from about 100° F., to about 300° F. A breaker system is included in the compositions comprised of an alkali metal chlorite or hypochlorite breaker and a breaker activator comprised of copper II ion or an amine, or both.

16 Claims, No Drawings

METHODS AND COMPOSITIONS FOR BREAKING VISCOSIFIED FLUIDS

BACKGROUND OF THE INVENTION

1. Field of the Invention

The present invention relates to methods and compositions for treating subterranean formations, and more specifically, to methods and compositions for breaking fracturing fluids utilized in the stimulation of subterranean formations.

2. Description of the Prior Art

It is common practice to treat subterranean formations to increase the permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam having a proppant such as sand or other particulate material suspended therein is introduced into the fractures. The proppant is deposited in the fractures and functions to hold the fractures open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a viscosifier such as a polysaccharide gelling agent is used to gel the fracturing fluid to provide the high viscosity needed to realize the maximum benefits from the fracturing process.

After the high viscosity fracturing fluid has been pumped into the formation and fracturing of the formation has occurred, it is desirable to remove the fluid from the formation to allow hydrocarbon production through the new fractures. Generally, the removal of the highly viscous fracturing fluid is realized by "breaking" the gel or in other words, by converting the fracturing fluid into a low viscosity fluid. Breaking the gelled fracturing fluid has commonly been accomplished by adding a "breaker," that is, a viscosity-reducing agent, to the fracturing fluid prior to pumping into the subterranean formation. However, this technique can be unreliable and sometimes results in incomplete breaking of the fluid, particularly when gel stabilizers are present, and/or premature breaking of the fluid before the fracturing process is complete.

U.S. Pat. No. 5,413,178 discloses a means for breaking an aqueous based fracturing fluid or treatment fluid at a temperature above 200° F., through use of an effective amount of an alkali metal chlorite or hypochlorite. The breaker is particularly effective in the temperature range of 200° F. to about 300° F. It has been determined that alkali metal chlorites generally are ineffective as a breaker within a reasonable time period at temperatures below about 200° F.

Thus, it is desirable to provide means by which alkali metal chlorites or hyprochlorites can be utilized to provide controlled breaks of viscosified fluids at temperatures in the range of from about 100° F. to about 200° F.

SUMMARY OF THE INVENTION

The present invention relates to methods and compositions for controllably breaking an aqueous fracturing fluid or treatment fluid which has been viscosified with a polysaccharide at temperatures in the range of from about 100° F. to about 300° F. The methods are basically comprised of the addition of an effective amount of copper II ion or an amine, or both, to the fracturing or treatment fluid in combination with an effective amount of an alkali metal chlorite or hypochlorite breaker whereby the breaker is activated to provide a controlled break at the above mentioned temperatures.

It is, therefore, a general object of the present invention to provide methods and compositions for breaking viscosified fluids.

Other and further objects, features and advantages of this invention will be readily apparent to those skilled in the art upon a reading of the description of preferred embodiments which follows.

DESCRIPTION OF PREFERRED EMBODIMENTS

The viscosifying or gelling agent employed in the present invention includes natural and derivatized polysaccharides which are soluble, dispersible or swellable in an aqueous liquid to yield viscosity to the liquid. One group, for example, of polysaccharides which are suitable for use in the present invention includes arabic gum, ghatti gum, karaya gum, tamarind gum, tagacanth gum, guar gum, locust bean gum and the like. Modified gums such as carboxyalkyl derivatives, like carboxymethyl guar, and hydroxyalkyl derivatives, like hydroxypropyl guar can also be employed. Doubly derivatized gums such as carboxymethylhydroxypropyl guar (CMHPG) can also be used.

Modified celluloses and derivatives thereof can also be employed in the practice of the present invention, for example, cellulose ethers, esters and the like. In general, any of the water-soluble cellulose ethers can be used. Those cellulose ethers include, among others, the various carboxyalkyl cellulose ethers, such as carboxyethyl cellulose and carboxymethyl cellulose (CMC); mixed ethers such as carboxyalkyl ethers, e.g., carboxymethyl hydroxyethyl cellulose (CMHEC); hydroxyalkyl celluloses such as hydroxyethyl cellulose (HEC) and hydroxypropyl cellulose; alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethylcellulose; hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565, issued to Holtmyer, et al. on Nov. 26, 1991, the entire disclosure of which is incorporated herein by reference. The most preferred polysaccharides are the galactomanans, modified or derivative galactomanans, and cellulose derivatives, examples of which are given above.

The chemistry and materials involved in the preparation of polysaccharide gelled fluids of the type described above (often referred to as "Linear Gels") is well understood in the art. Typically, the amount of gelling or viscosifying agent employed in the aqueous gel depends upon the desired viscosity of the aqueous gel. The gelling agent generally is present in an amount of from about 10 to about 120 pounds per 1000 gallons of fluid. The preferred concentration is in the range of from about 15 to about 60 pounds per 1000 gallons of fluid.

The aqueous gel may include a cross-linking agent to further enhance the development of viscosity by cross-linking the gelling agent. The cross-linking agent can comprise a borate releasing compound or any of the well known transition metal ions which are capable of creating a cross-linked structure with the particular gelling agent utilized. Examples of such cross-linking agents include a borate releasing compound such as sodium tetraborate, aluminum, zirconium or titanium chelates, antimony compounds and the like. The cross-linking agent can be controlled to permit introduction of the aqueous gel into a well bore before the viscosity of the gel significantly increases.

The aqueous fluid utilized in the preparation of the gel often includes a salt such as potassium chloride to minimize the swelling of clays and the chances of damage to the subterranean formation upon contact with the fluid. The aqueous fluid may include any of the other conventional additives such as proppants, pH control agents, bactericides, clay stabilizers, surfactants and the like which do not adversely react with the other constituents to inhibit performance of the desired treatment upon a subterranean formation.

The breaker system for the gelled fluid of this invention comprises an effective amount of at least one compound selected from the group consisting of alkali metal chlorites or hypochlorites in at least partially water soluble form and an effective amount of a breaker activator comprised of copper II ($Cu^{2+}$) ion or an amine, or both copper II ion and an amine. When the activator includes both copper II ion and an amine, a synergistic effect takes place which causes a faster reduction in viscosity than when copper II ion alone or an amine alone are used.

The amount of breaker system employed is that amount required to reduce the viscosity of the stabilized gelled fluid at a temperature above about 100° F. to a preselected lower viscosity or to a complete break within a desired period of time. The optimum or effective amount of breaker system employed in the present invention depends on factors such as the injection period desired, the particular gelling agent and its concentration, the particular breaker and the formation temperature as well as other factors. Typically, however, from about 0.1 to about 30 pounds of the chlorite breaker is employed per 1000 gallons of gelled fluid. Most preferably, to achieve a desired break in from about 6 to 24 hours in the fluid, from about 1 to about 10 pounds of chlorite is employed per 1000 gallons of fluid.

The amount of breaker activator employed, comprised of copper II ion alone, an amine alone or both copper II ion and an amine, is that amount required to activate the chlorite breaker in the temperature range of from about 100° F. to about 300° F. to yield a lower viscosity within a desired period of time. The optimum or effective amount of activator depends on factors such as the injection period desired, the particular gelling agent and its concentration, the particular breaker and the formation temperature as well as other factors.

When copper II ion is used, it can be added to the gelled fluid in various forms such as salts, e.g., copper chloride, copper sulfate and the like, aqueous solutions of such salts or an aqueous solution of a complex formed by a chelating agent such as ethylenediaminetetracetic acid (EDTA) and copper II ion. Typically, in whatever form the copper II ion breaker activator takes, it is combined with the gelled fluid in an amount whereby the copper II ion is present in the gelled fluid in an amount in the range of from about 3 to about 240 parts per million (ppm). Preferably, the copper II ion is present in the fluid in an amount in the range of from about 9 to about 90 ppm so that the fluid breaks in less than about 24 hours at temperatures below about 200° F.

Alternatively, as mentioned above, an amine can be substituted for the copper II ion as the activator. A variety of amines can be used including, but not limited to, tetraethylenepentamine, butyl amine, ethylene diamine and diethylene triamine as well as ammonia and ammonium salts such as ethylene diamine hydrogen chloride salt. Of these, diethylene triamine is preferred. Typically, the amine is combined with the gelled fluid in an amount in the range of from about 0.025 to about 40 pounds of amine per 1000 gallons of fluid. Most preferably, to achieve desired breaks in less than 24 hours at temperatures below about 200° F., from about 0.1 to about 15 pounds of amine per 1000 gallons of fluid are employed. The term "amine" as used herein is intended to also include those compounds generally referred to as amine precursors which are capable of decomposing under the conditions of use to form amines in the fluid.

When it is desired to more rapidly break gelled fluids at a temperature below about 200° F., a combined activator comprised of an amine and copper II ion can be employed. The optimum or effective amount of the combined activator depends upon factors such as the injection period desired, the particular gelling agent used, the breaker used and formation temperatures as described above. Generally, the total combined activator is employed in about the same amount as either single activator alone, i.e., the combined activator includes copper II ion in an amount of from about 1.5 to 120 ppm and an amine in an amount of from about 0.125 to about 20 pounds per 1000 gallons of fluid.

Surprisingly, the alkali metal chlorite or hypochlorite breaker can be dissolved in water along with the activator comprised of copper II ion or amine, or both, to form a single stable breaker solution which can be added directly to the viscosified fluid.

In order to further illustrate the methods and compositions of this invention, the following examples are given.

EXAMPLE 1

Static break tests were performed to evaluate the break capabilities of the breaker activators of this invention in an aqueous linear gel. The aqueous gel was prepared by adding to an aqueous solution containing 2% by weight potassium chloride, hydroxypropylguar gelling agent in an amount of 80 pounds per 1000 gallons of solution, sodium carbonate buffer in the amount of 10 pounds per 1000 gallons of solution and sodium chlorite breaker in the amount of 10 pounds per 1000 gallons of solution. Various quantities of a breaker activator comprised of an aqueous salt solution containing a copper II ion EDTA chelate was added to the aqueous gel in the amounts given in Table I below. The break tests were performed at a temperature of 175° F. and consisted of measuring the apparent viscosity of the aqueous gel using a Fann Model 35 viscometer at 300 rpm over a 48 hour time period. The results of these tests are given in Table I below.

TABLE I

LINEAR GEL BREAK TESTS

| Sample No. | Sodium Chlorite Breaker, pounds per 1000 gallons | Copper II Ion Breaker Activator[1], ppm | Viscosity Over Time, cps | | | | |
|---|---|---|---|---|---|---|---|
| | | | 1 hr | 2 hr | 4 hr | 24 hr | 48 hr |
| 1 | 10 | 0 | 73 | 74 | 63 | 24 | 10 |
| 2 | 10 | 10 | 69 | 52 | 41 | 9 | 5 |
| 3 | 10 | 20 | 67 | 46 | 38 | 7 | 5 |
| 4 | 10 | 40 | 57 | 40 | 27 | 5 | 3 |
| 5 | 10 | 80 | 50 | 25 | 13 | 5 | 2 |

[1]Added in the form of an aqueous solution containing a EDTA/$Cu^{2+}$ complex.

As shown in Table I above, sodium chlorite alone in the aqueous gel reduced the viscosity in 48 hours to 10 cps. By adding as little as 10 ppm of the aqueous solution containing copper II ion, the viscosity of the aqueous gel was reduced to below 10 cps in 24 hours. The addition of the copper II ion aqueous solution in an amount of 80 ppm decreased the viscosity to 13 cps in 4 hours.

EXAMPLE 2

The amount of sodium chlorite in the above described aqueous linear gel was reduced to 1.25 pounds per 1000 gallons. The same quantities of copper II ion were added to test samples of the gel and the samples were subjected to break tests at 175° F. The results of these tests are shown in Table II below.

TABLE II

LINEAR GEL BREAK TESTS AT 175° F.

| Sample No. | Sodium Chlorite Breaker, pounds per 1000 gallons | Copper II Ion Breaker Activator[1], ppm | Viscosity Over Time, cps | | | |
|---|---|---|---|---|---|---|
| | | | 1 hr | 2 hr | 4 hr | 24 hr |
| 1 | 1.25 | 0 | 86 | 87 | 86 | 70 |
| 2 | 1.25 | 10 | 74 | 60 | 45 | 16 |
| 3 | 1.25 | 20 | 74 | 56 | 40 | 13 |
| 4 | 1.25 | 40 | 65 | 45 | 28 | 8 |
| 5 | 1.25 | 80 | 66 | 39 | 21 | 5 |

[1]Added in the form of an aqueous solution containing a EDTA/$Cu^{2+}$ complex.

As shown in Table II, the low quantities of sodium chlorite breaker in combination with the aqueous solution containing copper II ion in quantities of from 40 to 80 ppm provided viscosities of less than 10 cps in 24 hours.

EXAMPLE 3

Additional static break tests were performed utilizing an aqueous cross-linked gel prepared by adding to an aqueous solution containing 2% potassium chloride, guar gelling agent in an amount of 25 pounds per 1000 gallons. Portions of the resulting aqueous gel were cross-linked by adding a borate buffered with sodium carbonate thereto, and various amounts of sodium chlorite and the above described aqueous solution containing EDTA chelated copper II ion were added to test samples as shown in Table III below. Break tests were run on the various test samples of cross-linked aqueous gel at temperatures of 150° F., 170° F. and 190° F., and the results of the tests are shown in Table III below.

TABLE III

CROSS-LINKED GEL BREAK TESTS

| Sample No. | Temp., ° F. | Sodium Chlorite Breaker, pounds per 1000 gallons | Copper II Ion Breaker activator[1], ppm | Viscosity Over Time, cps | | | | | |
|---|---|---|---|---|---|---|---|---|---|
| | | | | .5 hr | 1 hr | 2 hr | 4 hr | 6 hr | 24 hr |
| 1 | 150 | 10 | 0 | $C^2$ | $C^2$ | $C^2$ | $C^2$ | $C^2$ | $C^2$ |
| 2 | 150 | 10 | 20 | $C^2$ | $C^2$ | $C^2$ | $C^2$ | $WC^3$ | 3 |
| 3 | 150 | 10 | 40 | $C^2$ | $C^2$ | $C^2$ | $WC^3$ | 11 | 3 |
| 4 | 150 | 10 | 60 | $C^2$ | $C^2$ | $WC^3$ | $WC^3$ | 6 | 3 |
| 5 | 170 | 5 | 0 | $C^2$ | $C^2$ | $C^2$ | $C^2$ | $C^2$ | $WC^3$ |
| 6 | 170 | 5 | 10 | $C^2$ | $C^2$ | $C^2$ | $C^2$ | 27 | 3 |
| 7 | 170 | 5 | 20 | $C^2$ | $C^2$ | $C^2$ | $WC^3$ | 4 | 2 |
| 8 | 170 | 5 | 40 | $C^2$ | $C^2$ | $WC^3$ | 5 | — | 2 |
| 9 | 190 | 5 | 0 | $C^2$ | $C^2$ | $C^2$ | $C^2$ | $C^2$ | 2 |
| 10 | 190 | 5 | 10 | $C^2$ | $C^2$ | $WC^3$ | 3 | — | 2 |
| 11 | 190 | 5 | 20 | $C^2$ | $C^2$ | 5 | — | — | 2 |
| 12 | 190 | 5 | 40 | $C^2$ | $C^2$ | 3 | — | — | 2 |

[1]Added in the form of an aqueous solution containing a EDTA/$Cu^{2+}$ complex.
[2]C means Cross-linked.
[3]WC means Weak Cross-linked.

From Table III, it can be seen that increasing quantities of the copper II ion breaker activator provided rapid breaks in viscosity at 150° F., 170° F. and 190° F.

EXAMPLE 4

Additional break tests were conducted utilizing a portion of the aqueous cross-linked gel described in Example 3. Except for the control test (Sample No. 2), the test samples contained sodium chlorite in the amount of 5 pounds per 1000 gallons and various quantities of an amine breaker activator. Some of the samples also contained copper II ion breaker activator in an amount of 20 ppm. Break tests were conducted on the test samples at 170° F. The results of these tests are given in Table IV below.

Additional break tests at 170° F. were conducted utilizing the same cross-linked aqueous gel, different amine breaker activators and various quantities of the copper II ion breaker activator. The results of these tests are shown in Table V below.

TABLE IV

CROSS-LINKED GEL BREAK TESTS AT 170° F.

| Sample No. | Sodium Chrorite Breaker, popunds per 1000 gallons | Copper II Ion Breaker Activator[1], ppm | Amine Breaker Activator, gallons per 1000 gallons | Viscosity Over time, cps | | | | | |
|---|---|---|---|---|---|---|---|---|---|
| | | | | 0.5 hr | 1 hr | 2 hr | 4 hr | 6 hr | 24 hr |
| 1 | 5 | 0 | 0 | $C^4$ | $C^4$ | $C^4$ | $C^4$ | $C^4$ | 8 |
| 2 | 0 | 0 | $0.4^2$ | $C^4$ | $C^4$ | $C^4$ | $C^4$ | $C^4$ | 8 |
| 3 | 5 | 0 | $0.04^2$ | $C^4$ | $C^4$ | $C^4$ | $WC^5$ | $WC^5$ | 8 |
| 4 | 5 | 0 | $0.4^2$ | $WC^5$ | 9 | 6 | 6 | — | — |
| 5 | 5 | 0 | $4^2$ | 7 | 5 | — | — | — | — |
| 6 | 5 | 20 | 0 | $C^4$ | $C^4$ | $C^4$ | $WC^5$ | $WC^5$ | 8 |
| 7 | 5 | 20 | $0.04^2$ | $WC^5$ | 4 | — | — | — | — |
| 8 | 5 | 20 | $0.4^2$ | $WC^5$ | 19 | 6 | — | — | — |
| 9 | 5 | 20 | $4^2$ | 7 | 5 | — | — | — | — |
| 10 | 2.5 | 0 | 0 | $C^4$ | $C^4$ | $WC^5$ | $WC^5$ | — | 5 |
| 11 | 2.5 | 0 | $0.1^3$ | $C^4$ | $C^4$ | $WC^5$ | $WC^5$ | — | 4 |
| 12 | 2.5 | 0 | $0.25^3$ | $C^4$ | $C^4$ | $WC^5$ | 5 | — | — |
| 13 | 5 | 0 | $0.1^3$ | $C^4$ | $C^4$ | $WC^5$ | $WC^5$ | — | 5 |
| 14 | 5 | 0 | $0.25^3$ | $C^4$ | $WC^5$ | $WC^5$ | 7 | — | — |
| 15 | 5 | 0 | $0.5^3$ | $C^4$ | $WC^5$ | 12 | 5 | — | — |
| 16 | 5 | 20 | 0 | $C^4$ | $WC^5$ | 5 | — | — | — |
| 17 | 5 | 20 | $0.1^3$ | $C^4$ | 3 | — | — | — | — |
| 18 | 5 | 20 | $0.25^3$ | $WC^5$ | 3 | — | — | — | — |
| 19 | 5 | 20 | $0.5^3$ | 3 | — | — | — | — | — |

[1]Added in the form of an aqueous solution containing a EDTA/$Cu^{2+}$ complex.
[2]Tetraethylenepentamine as a neutralized 10% active solution.
[3]Diethylene triamine as a neutralized 10% active solution.
[4]C means Cross-linked.
[5]WC means Weak Cross-linked.

TABLE V

CROSS-LINKED-GEL BREAKS TESTS AT 170° F.

| Sample No. | Sodium Chlorite Breaker, pounds per 1000 gallons | Copper II Ion Breaker Activator[1], ppm | Amine Breaker Activator Tested | Amine Amount, pounds or gallons per 10 gallons | Viscosity Over Time, cps | | | | | |
|---|---|---|---|---|---|---|---|---|---|---|
| | | | | | 0.5 hr | 1 hr | 2 hr | 4 hr | 6 hr | 24 hr |
| 1 | 5 | 0 | butyl amine | 1 (gal) | $C^2$ | $C^2$ | $C^2$ | $WC^3$ | 7 | 4 |
| 2 | 5 | 20 | butyl amine | 1 (gal) | $C^2$ | 6 | 4 | — | — | — |
| 3 | 5 | 0 | ethylene diamine hydrogen chloride salt | 23 (lbs) | $C^2$ | $WC^3$ | $WC^3$ | $WC^3$ | $WC^4$ | 23 |
| 4 | 5 | 20 | ethylene diamine hydrogen chloride salt | 23 (lbs) | $C^2$ | $WC^3$ | $WC^3$ | $WC^3$ | 10 | 3 |
| 5 | 5 | 0 | diethylene triamine | 4 (gal) | $WC^3$ | 19 | 11 | 9 | 5 | — |
| 6 | 5 | 20 | diethylene triamine | 4 (gal) | 9 | 7 | — | — | — | — |

[1]Added in the form of an aqueous solution containing a EDTA/$CU^{2+}$ complex.
[2]C means Cross-linked.
[3]WC means Weak Cross-linked.

The test results given in Tables IV and V show that the combination activator comprised of copper II ion combined with an amine results in the synergistic effect of an even faster break.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating a zone of a subterranean formation penetrated by a well bore wherein the static temperature of the zone is above about 100° F. comprising:

injecting into the well bore and into contact with said formation an aqueous gelled fluid comprised of an aqueous liquid, a viscosity increasing amount of a gelling agent comprising at least one member selected from the group of galactomanans, modified or derivatized galactomanans and cellulose derivatives, a breaker comprising at least one member selected from the group of alkali metal chlorites and hypochlorites present in an amount sufficient to effect a controlled reduction in the viscosity of said fluid and a breaker activator comprised of at least one member selected from the group of copper II ion and an amine present in an amount sufficient to activate said breaker.

2. The method of claim 1 wherein said breaker is present in an amount in the range of from about 0.1 to 30 pounds per 1000 gallons of fluid.

3. The method of claim 1 wherein said formation has a temperature of from about 100° F. to about 300° F.

4. The method of claim 1 wherein said gelling agent comprises at least one member selected from the group of guar, hydroxypropylguar, carboxymethylhydroxypropylguar, carboxymethylhydroxyethylcellulose, carboxymethylcellulose and hydroxyethylcellulose grafted with vinyl phosphonic acid.

5. The method of claim 1 wherein said aqueous fluid further comprises a cross-linking agent including at least one member selected from the group of borate-releasing compounds, a source of titanium ions, a source of zirconium ions, a source of antimony ions and a source of aluminum ions.

6. The method of claim 1 wherein said breaker activator comprises copper II ion present in an amount in the range of from about 3 to 240 ppm of fluid.

7. The method of claim 1 wherein said breaker activator comprises an amine present in an amount in the range of from about 0.25 to about 40 pounds per 1000 gallons of fluid.

8. The method of claim 1 wherein said breaker activator is comprised of copper II ion in an amount in the range of from about 1.5 to about 120 ppm of fluid and an amine in an amount in the range of from about 0.125 to about 20 pounds per 1000 gallons of fluid.

9. A method of fracturing a subterranean formation penetrated by a well bore wherein the static temperature of the formation adjacent said well bore is above about 100° F., comprising injecting into the well bore and into contact with the formation at a rate and pressure sufficient to fracture the formation an aqueous fluid comprising:

a) an aqueous liquid;

b) a gelling agent comprising at least one member selected from the group of galactomanans, modified or derivatized galactomanans, and cellulose derivatives present in an amount sufficient to increase the viscosity of said aqueous liquid;

c) a cross-linking agent for said gelling agent present in an amount sufficient to effect cross-linking of said gelling agent in said aqueous liquid to further increase the viscosity of said aqueous liquid. d) a breaker comprising at least one member selected from the group of alkali metal chlorites and hypochlorites present in an amount sufficient to effect a controlled reduction in the viscosity of the cross-linked gelling agent of the aqueous liquid after a predetermined period of time; and e) a breaker activator comprised of at least one member selected from the group of copper II ion and an amine present in an amount sufficient to activate said breaker to provide said controlled reduction in viscosity.

10. The method of claim 9 wherein said breaker is present in an amount of from about 0.1 to 30 pounds per 1000 gallons of fluid.

11. The method of claim 9 wherein said formation has a temperature of from about 100° F. to about 300° F.

12. The method of claim 9 wherein said gelling agent comprises at least one member selected from the group of guar, hydroxypropylguar, carboxymethylhydroxypropylguar, carboxymethylhydroxyethylcellulose, carboxymethylcellulose and hydroxytehylcellulose grafted with vinyl phosphonic acid.

13. The method of claim 9 wherein said cross-linker comprises at least one member selected from the group of borate-releasing compounds, a source of titanium ions, a source of zirconium ions, a source of antimony ions and a source of aluminum ions.

14. The method of claim 9 wherein said breaker activator comprises copper II ion present in an amount in the range of from about 3 to about 240 ppm of fluid.

15. The method of claim 9 wherein said breaker activator comprises an amine present in an amount in the range of from about 0.25 to about 40 pounds per 1000 gallons of fluid.

16. The method of claim 9 wherein said breaker activator is comprised of copper II ion in an amount in the range of from about 1.5 to about 120 ppm of fluid and an amine in an amount in the range of from about 0.125 to about 20 pounds per 1000 gallons of fluid.

* * * * *